US012103030B1

(12) United States Patent
Ahmed et al.

(10) Patent No.: US 12,103,030 B1
(45) Date of Patent: Oct. 1, 2024

(54) SMART EDGE SEALING SYSTEM AND METHOD

(71) Applicant: UNITED ARAB EMIRATES UNIVERSITY, Al Ain (AE)

(72) Inventors: Waleed Khalil Ahmed, Al Ain (AE); Aamna Rashed Alshehhi, Al Ain (AE); Amna Salem Alrashdi, Al Ain (AE); Asma Khalil Badwo, Al Ain (AE); Sabah Raed Al Haddad, Al Ain (AE); Muthanna Ahmed Aziz, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/229,641

(22) Filed: Aug. 2, 2023

(51) Int. Cl.
*B05C 11/10* (2006.01)
*B05C 5/02* (2006.01)
*B05D 1/26* (2006.01)

(52) U.S. Cl.
CPC ........ *B05C 11/1007* (2013.01); *B05C 5/0204* (2013.01); *B05D 1/26* (2013.01); *B05D 1/265* (2013.01)

(58) Field of Classification Search
None
See application file for complete search history.

(56) References Cited

U.S. PATENT DOCUMENTS

| | | | |
|---|---|---|---|
| 9,395,041 B2 | 7/2016 | Perla et al. | |
| 9,452,443 B2 | 9/2016 | Grontved et al. | |
| 9,574,549 B2 | 2/2017 | Lee et al. | |
| 2010/0275692 A1* | 11/2010 | Meyer | G01N 29/221 73/627 |
| 2011/0126948 A1 | 6/2011 | Boyer et al. | |
| 2012/0061007 A1* | 3/2012 | Gunther | B29C 66/1142 156/94 |
| 2018/0029419 A1* | 2/2018 | Kim | B60C 7/12 |
| 2020/0171552 A1* | 6/2020 | Hamamura | B25J 11/0065 |
| 2020/0307101 A1* | 10/2020 | Schultz | B29C 64/393 |

FOREIGN PATENT DOCUMENTS

| | | |
|---|---|---|
| WO | 88/10182 A1 | 12/1988 |
| WO | 2021/121522 A1 | 6/2021 |
| WO | WO-2021121523 A1 * | 6/2021 |

* cited by examiner

*Primary Examiner* — Michael P. Rodriguez
(74) *Attorney, Agent, or Firm* — Nath, Goldberg & Meyer; Joshua B. Goldberg

(57) ABSTRACT

A smart edge sealing system includes a control, monitoring and communication module that includes a microcontroller unit (MCU) controlling system processes. A curing and quality control module (CQCM) includes an artificial intelligence camera and a machine learning algorithm that identifies defects or inconsistencies in the coating process and communicates with the control, monitoring and communication module. A plunger sliding module is controlled by the control, monitoring and communication module based on information received from the CQCM to extrude a coating material on an edge of a workpiece.

15 Claims, 11 Drawing Sheets

SMART EDGE SEALING SYSTEM AND METHOD

BACKGROUND

1. Field

The present disclosure relates to coating materials and quality control, and particularly to a system and method of coating edges of a material with quality control features.

2. Description of the Related Art

Composite materials have revolutionized various industries with their exceptional strength-to weight ratio, corrosion resistance, and design flexibility. However, ensuring the long-term durability and performance of composite structures requires effective protection against moisture ingress, delamination, and environmental factors. Composite edge sealing technology has emerged as a vital solution to address these challenges, providing a protective barrier along the edges of composite materials.

The edges of composite structures are more susceptible to damage, moisture infiltration, and degradation than their bulk material. Unsealed edges can compromise the structural integrity of such structures, leading to reduced performance and potentially expensive repairs. Composite edge sealing plays a pivotal role in enhancing durability, preventing delamination, and ensuring long-term performance. There are different application techniques currently used for edge sealing, including:

a. Adhesive Bonding: Adhesive materials are applied along the edges of composite structures, sealing and bonding them together. This technique improves resistance to moisture and environmental factors, while also providing structural reinforcement.

b. Resin Infusion: Resin infusion is a process where resin is infused into the edges of composite structures, sealing and reinforcing them. This technique enhances the material's moisture resistance and structural integrity.

c. Edge Fillers: Specialized fillers or tapes are used to seal the edges of composites. These materials create a protective barrier against moisture, chemicals, and other environmental factors.

d. Coatings: Various sealants, protective films, or coatings are applied to the edges of composites. These coatings provide a barrier that prevents moisture ingress and enhances durability.

Materials Currently Used for Composite Edge Sealing:

a. Epoxy-based Adhesives: Epoxy adhesives are commonly used for edge sealing due to their excellent bonding properties, moisture resistance, and compatibility with composite materials.

b. Polyurethane Sealants: Polyurethane sealants offer good adhesion, flexibility, and resistance to environmental factors. They are widely used for edge sealing in various industries.

c. Silicone-based Sealants: Silicone-based sealants provide excellent resistance to moisture, UV radiation, and temperature extremes. They offer long-term durability and are suitable for edge-sealing applications.

Composite edge sealing technology currently finds application in numerous industries, including:

a. Aerospace: Edge sealing ensures moisture resistance and structural integrity of composite aircraft components.

b. Automotive: Sealing composite body panels enhances corrosion resistance and maintains the structural integrity of vehicles.

c. Construction: Edge sealing of composite windows, doors, and building components improves energy efficiency and prevents water infiltration.

d. Marine: Edge sealing protects composite boat hulls from water ingress and delamination, increasing their lifespan.

Composite edge sealing technology plays a critical role in safeguarding composite structures against moisture, delamination, and environmental factors. By employing techniques such as adhesive bonding, resin infusion, edge fillers, and coatings, composite edge sealing enhances durability and maintains the long-term performance of composite materials. Epoxy-based adhesives, polyurethane sealants, and silicone-based sealants are commonly used materials for this purpose. The application of composite edge sealing technology spans industries such as aerospace, automotive, construction, marine, wind energy, and sports equipment manufacturing.

Advantages of Composite Edge Sealing:

Enhanced Durability: Composite edge sealing helps protect against moisture ingress, delamination, and environmental factors, thereby improving the durability and longevity of composite structures.

Improved Performance: By preventing damage and maintaining the structural integrity of composite materials, edge sealing contributes to better overall performance in terms of strength, stiffness, and resistance to degradation.

Protection Against Corrosion: Edge sealing technology can provide a barrier against corrosive substances, particularly in industries such as automotive and marine, where composites are exposed to harsh environments.

Customizable Solutions: Different edge sealing techniques and materials can be tailored to specific composite applications, allowing for customization and optimization of performance.

Edge sealing technology is a valuable tool for manufacturers of composite materials. It can help to improve the quality and performance of their products, and it can also help to reduce costs.

There are a variety of methods and apparatus for edge sealing composite materials. The methods typically involve the use of a sealant to bond the edges of the composite material together. The sealant can be applied in a variety of ways, including by hand, by roller, or by spray. The apparatus for edge sealing composite materials typically includes a sealant applicator and a pressure roller. The sealant applicator is used to apply the sealant to the edges of the composite material, and the pressure roller is used to apply pressure to the sealant to ensure that it bonds the edges of the composite material together. Edge sealing is an important process in the manufacturing of composite materials. It helps to prevent the infiltration of moisture and other contaminants into the composite material, which can lead to premature failure. Edge sealing also helps to improve the strength and durability of the composite material.

However, there remains a need for new, automated edge sealing methods with effective quality control.

SUMMARY

A smart edge sealing device with quality control features is an adaptable and sustainable portable device for coating and quality control for different applications, especially industrial and aerospace industries and composite materials. It supports the coating and protection process of edges and cut boards of different materials like composites. The system has a robust, lightweight, and durable design that overcomes the limitations of existing traditional techniques by achieving consistent coating of a material like paint, glue, or epoxy over machined edges of a part, controlling the thickness of the applied coating, monitoring the process for any defects, and simultaneously performing cleaning. The system ensures that machined edge surfaces are consistently coated and reliably sealed to meet industrial and other advanced manufacturing standards while overcoming the drawbacks of the manual process currently in use.

A smart edge sealing system, in one embodiment, includes a control, monitoring and communication module that has a microcontroller unit (MCU) controlling system processes. A curing and quality control module (CQCM) includes an artificial intelligence camera and a machine learning algorithm that identifies defects or inconsistencies in the coating process and communicates with the control, monitoring and communication module. A plunger sliding module is controlled by the control, monitoring and communication module, based on information received from the CQCM, to extrude a coating material on an edge of a workpiece.

The control, monitoring and communication module can adjust the position of the plunger sliding module according to information received from the CQCM.

The CQCM can further include a marking paint jet that marks a defect area on the workpiece.

A UV light can assist in the curing process.

Front and back distance transducers can measure the height concerning an edge to be treated.

A motion and alignment module can be connected to the plunger sliding module and the workpiece.

The motion and alignment module can include sided wheels spaced apart to be positioned on either side of the workpiece.

The sided wheels can include wavy damping ribs.

The sided wheels can be 3D printed using thermoplastic polyurethane (TPU) material.

A smart edge sealing method can include: determining the distance of a plunger sliding module from an edge portion of a workpiece through a curing and quality control module (CQCM); calculating an amount of a coating material to be extruded from the plunging sliding module onto the edge portion of the workpiece through the CQCM; and controlling the plunger sliding module based on information communicated from the CQCM to a control monitoring and communication module to extrude the coating material onto the edge portion of the workpiece.

The method can further include adjusting the position of the plunger sliding module according to information received from the CQCM through the control monitoring and communication module.

The method can further include marking a defect area on the workpiece with a marking paint jet of the CQCM.

The method can further include curing the coating material extruded on the workpiece with a UV light.

The method can further include measuring the height of the edge of the workpiece using front and back distance transducers.

The method can further include moving the plunger sliding module with sided wheels of a motion and alignment module. The sided wheels can be located on either side of the workpiece.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A self-driving machine device that automatically coats an edge surface can include wheels with integrated damping for adapting to surface changes. A motor can drive the wheels through a gear box/transmission connection. The coating material can be dispensed from a plunger sliding module held at an angle by a linear actuator and holding straps. Front and rear distance transducers can constantly measure height concerning the edge. A microcontroller unit can control the various system processes. Artificial intelligence may be used to monitor and improve the coating quality. A separate embodiment includes a handheld version of the edge sealing device.

Figure 1A:
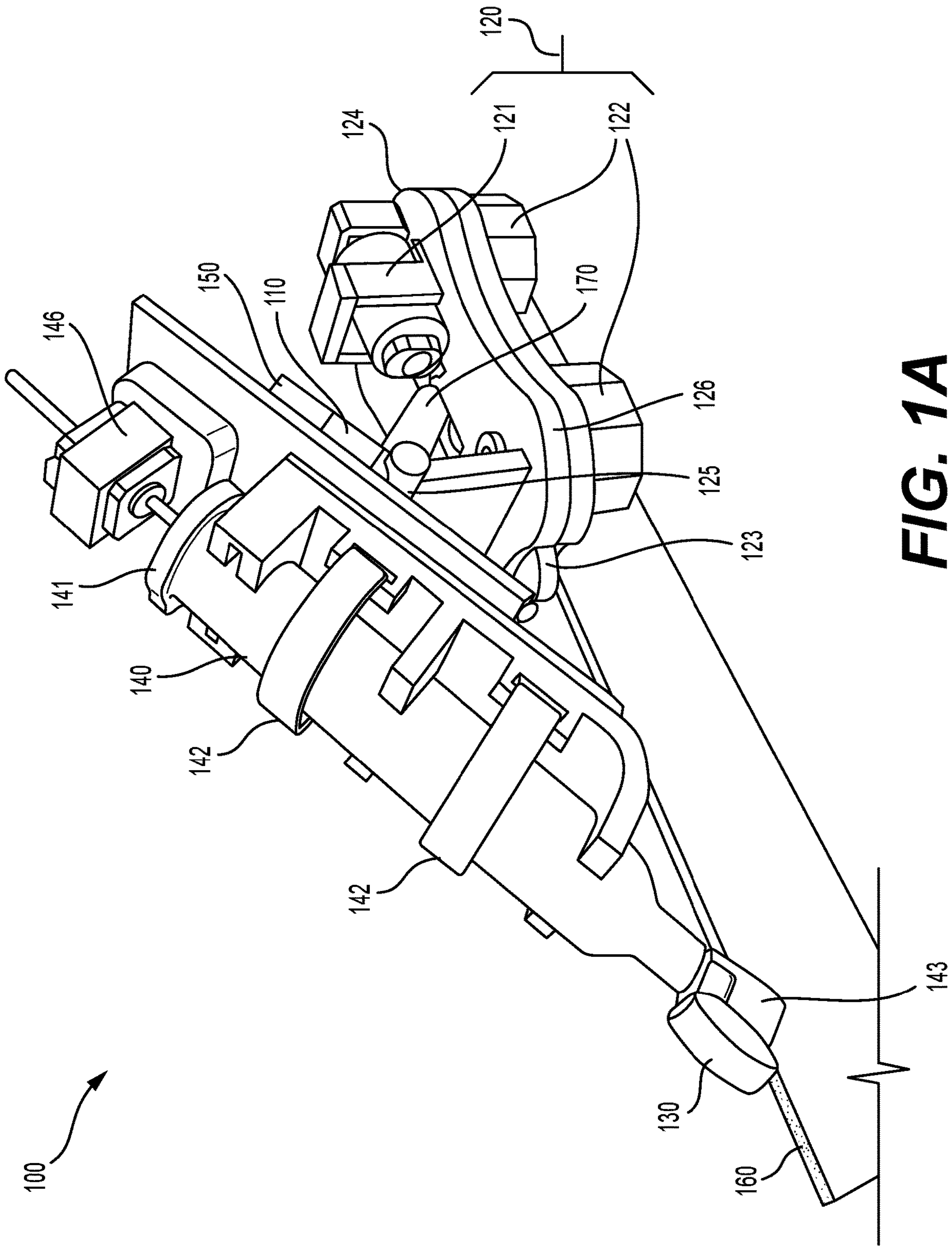
FIG. 1A is an illustration of an automated smart edge sealing device.
Figure 1B:
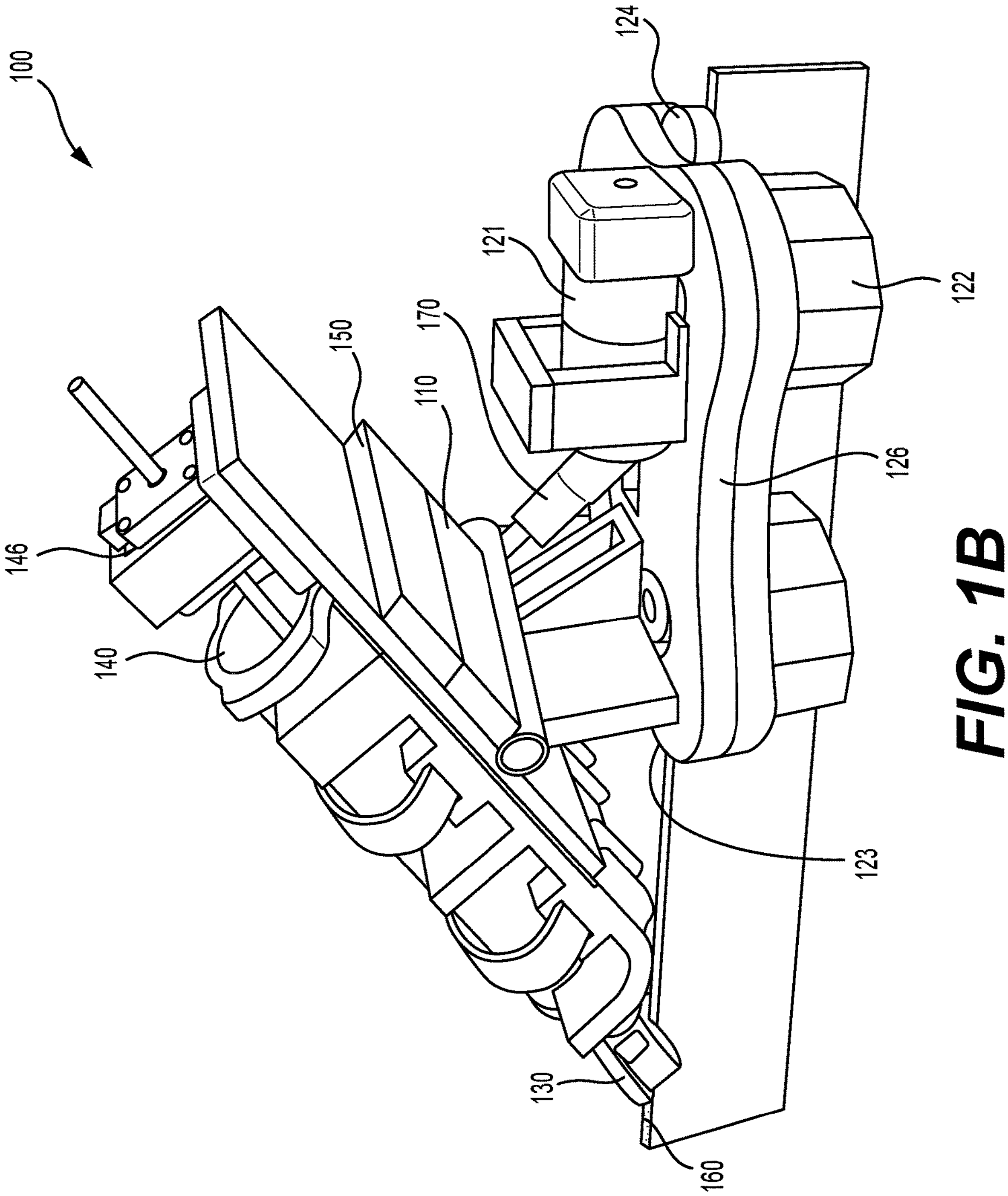
FIG. 1B is a rear view of the automated smart edge sealing device.

FIG. 1A is an illustration of an automated smart edge sealing device 100, and FIG. 1B is a rear view of the automated smart edge sealing device 100. In this embodiment, the smart edge sealing device 100 includes a control, monitoring and communications module 110, a motion and alignment module 120, a curing and quality control module (CQCM) 130, a plunger sliding module 140, and a power module 150.

The motion and alignment module 120 includes a DC motor 121 that drives wheels 122. It also includes front and rear transducers 123,124, a hinge 125 and an upper rotating base 126.

The core of the control, monitoring, and communication module 110 is an embedded microcontroller unit (MCU) that controls all system processes. Data from a variety of sensors is acquired and analyzed by the MCU. Based on the results, a decision is made to control the system actuators and achieve the desired functionality.

The motion and alignment module 120 is responsible for moving and stabilizing the system. A geared DC motor 121 drives the sided wheels 122 through a mechanical transmission mechanism. Two proximity transducers 123,124 located on the device's front and rear enable the detection of the end of the edge to stop the system. Based on the feedback received from the quality control module 130, the speed is adjusted to achieve the best coating quality of the coating material 160.

Figure 2A:
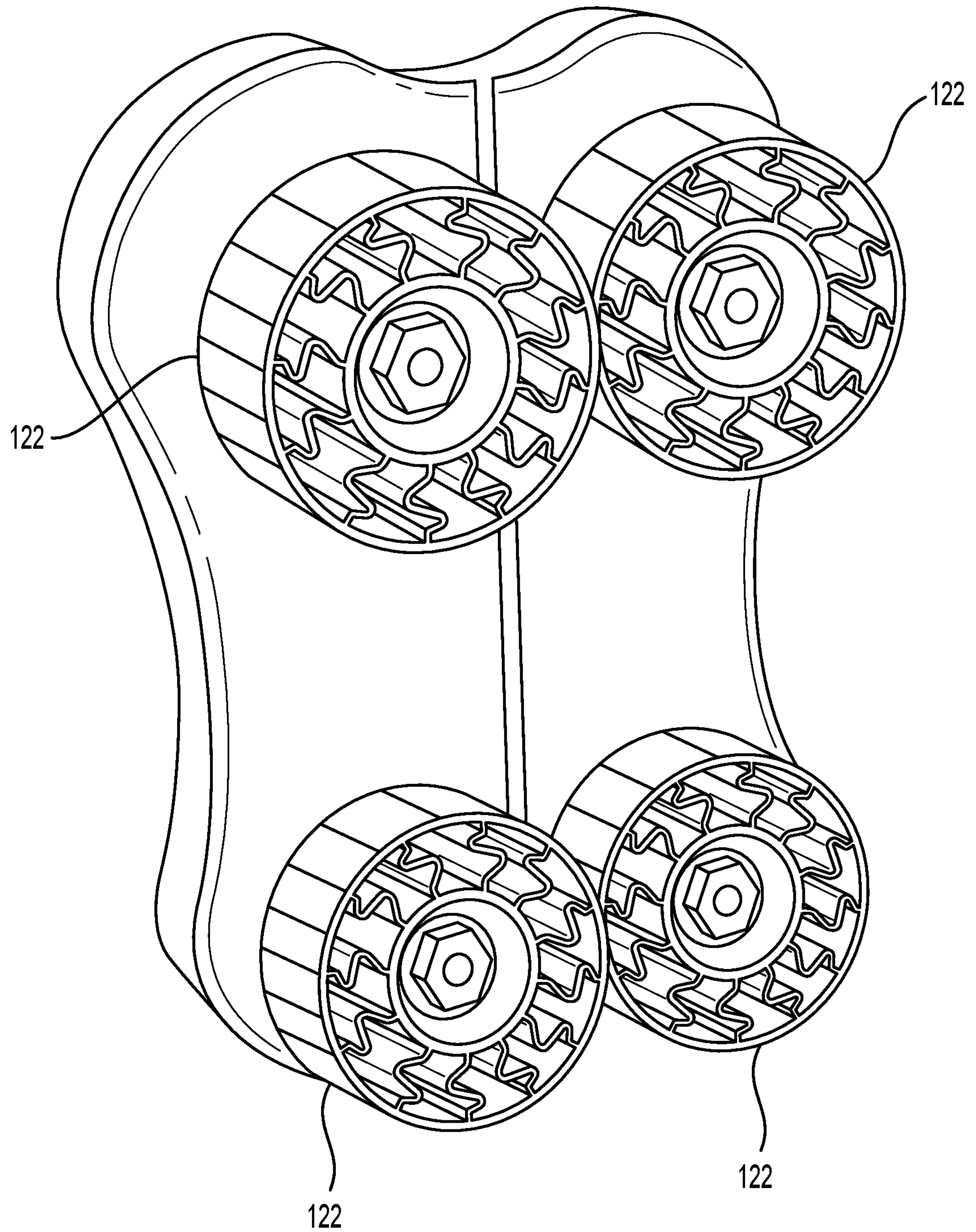
FIG. 2A and FIG. 2B are illustrations of the sided wheels.
Figure 2B:
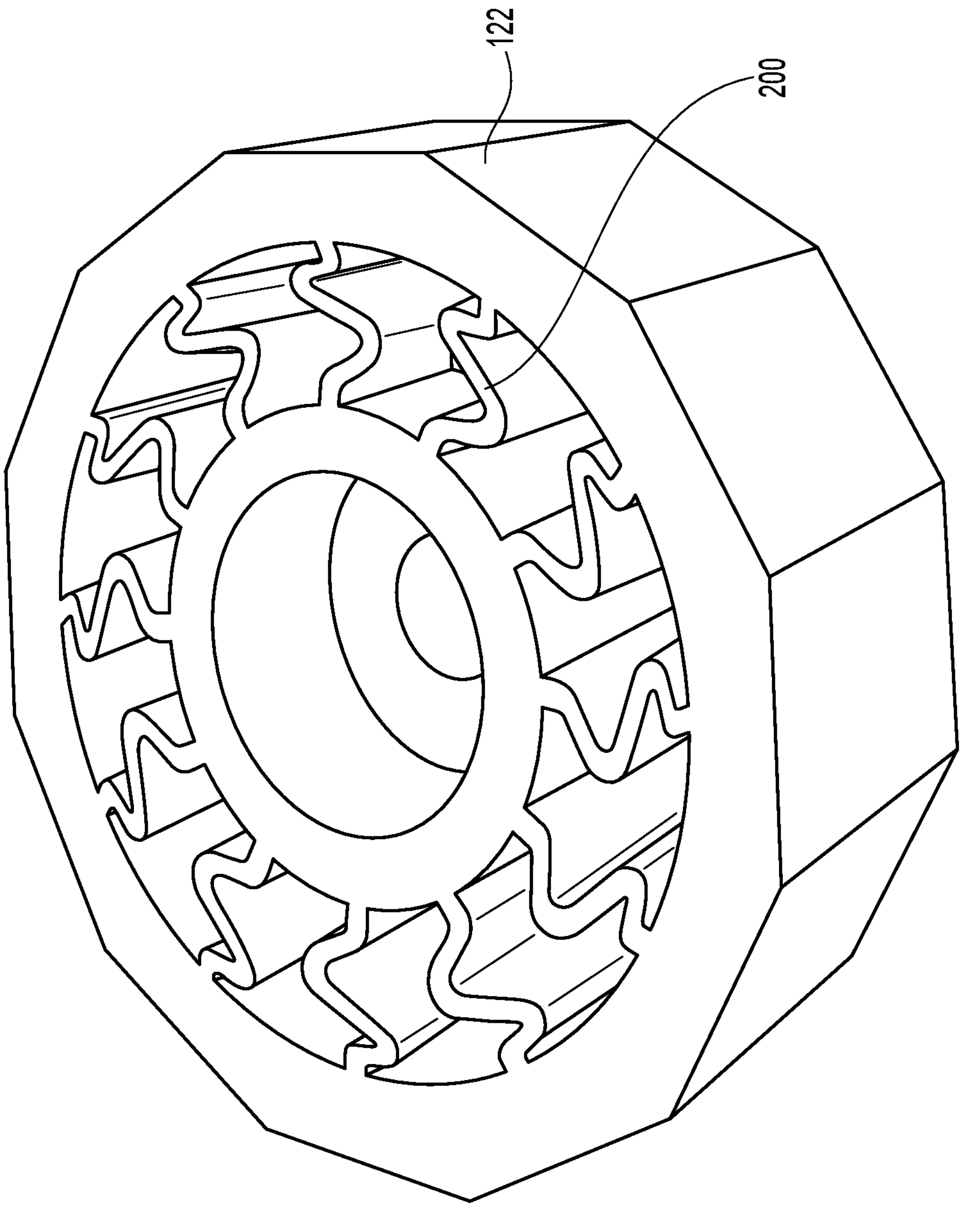

FIG. 2A and FIG. 2B are illustrations of the sided wheels 122 which are 3D Printed using thermoplastic polyurethane (TPU) material to perform both flexibility and strength. The sided wheels 122 have straight sides to avoid slipping, and to provide better friction and surface stability for uneven and slippery surfaces, used to count the travel linear displacement by counting the rotation angle. They have wavy damping ribs (WDR) 200 that perform damping characteristics due to the wavy shape, as well as allowing the application of a range of holding pressure on the edge while the trolley is traveling, and this will give a wide range of holding pressure due to the possible change in the edge thickness.

Figure 3A:
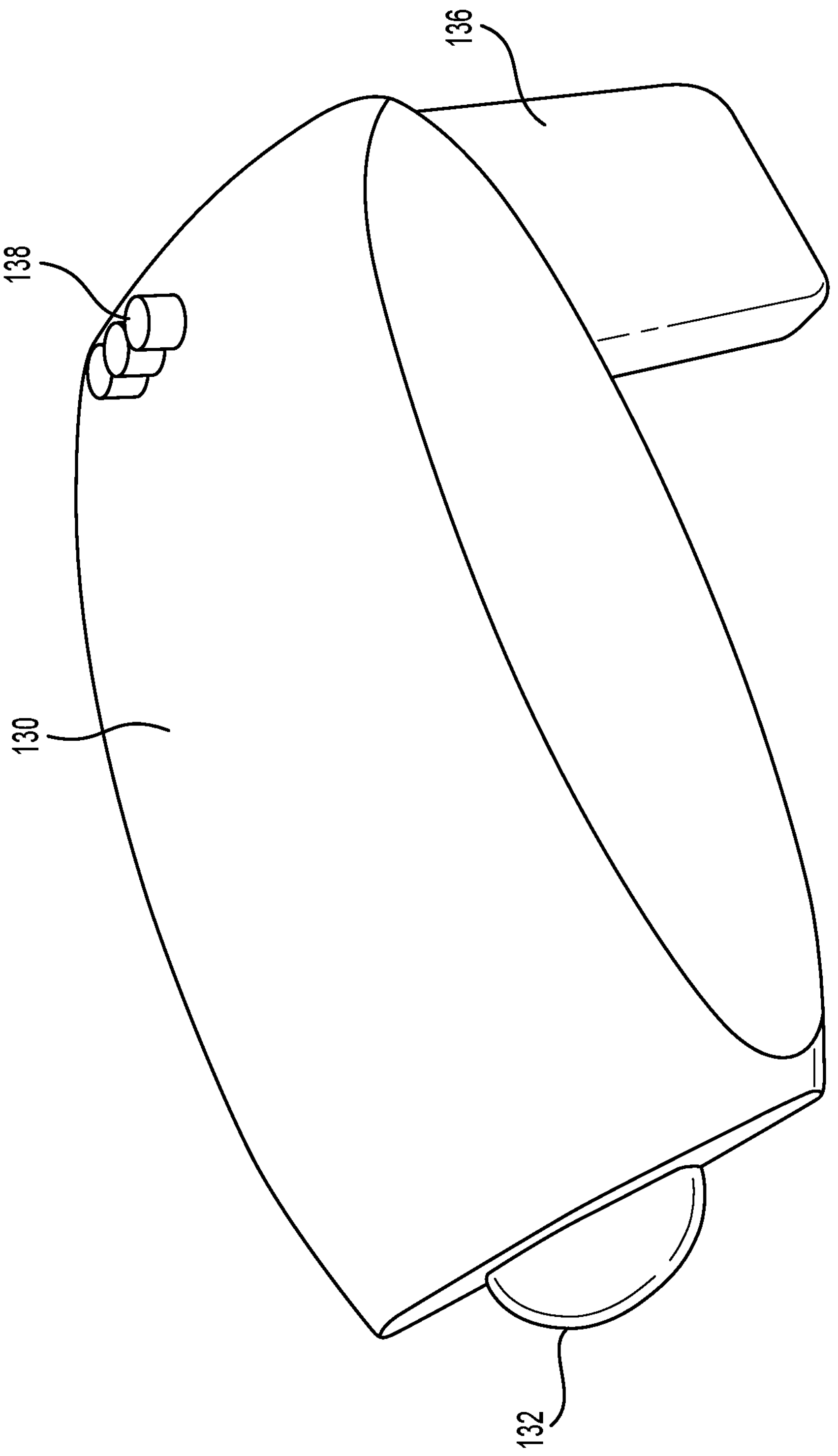
FIG. 3A is an illustration of the curing and quality control module (CQCM).
Figure 3B:
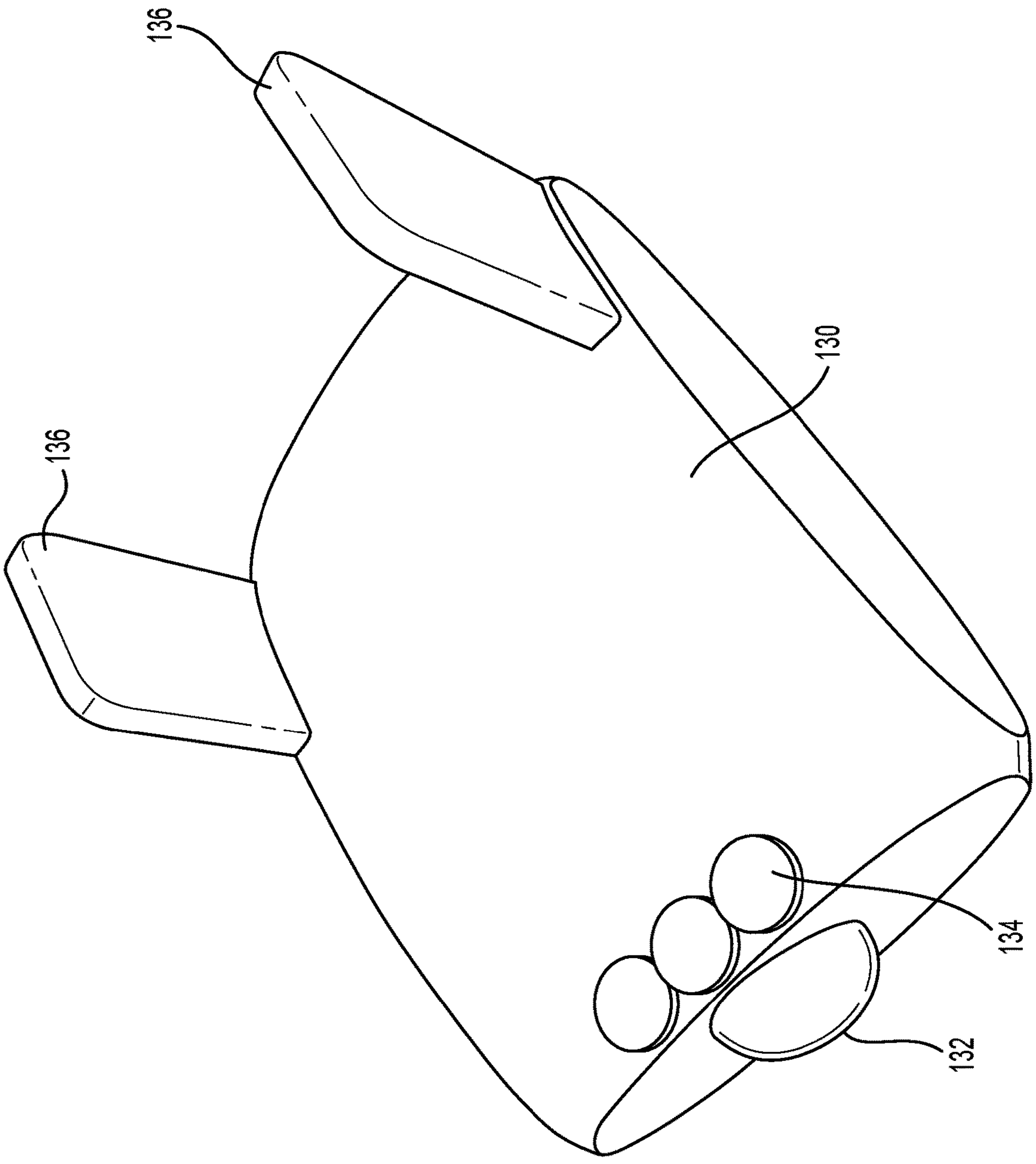
FIG. 3B is an illustration of the bottom side of the CQCM having a UV light.

FIG. 3A is an illustration of the curing and quality control module (CQCM) 130 which includes an artificial intelligence camera 132 mounted on the module's top. The artificial intelligence camera 132 monitors the consistency and quality of the coating material 160. A machine learning algorithm analyzes the acquired images to identify any defects or inconsistencies in the coating process. The main controller adjusts the device motion speed and coating material extrusion speed based on this feedback to achieve the best coating quality. In the case of a defect, a small marking paint jet is released on the side to mark the defect area. A UV light 134 located on the bottom of the CQCM 130, as illustrated in FIG. 3B, can be applied to the coating material 160 to help in the curing process. The CQCM 130 could be easily attached and detached with a set of clips 136. Connection terminals 138 are also provided on a top portion of the CQCM 130.

The power module 150 provides the required power for system operations and includes batteries, a charging unit and a power regulation unit.

Figure 4:
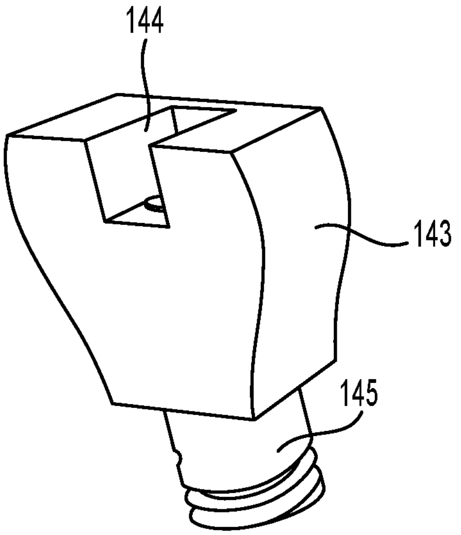
FIG. 4 is an illustration of an injection nozzle.
Figure 5:
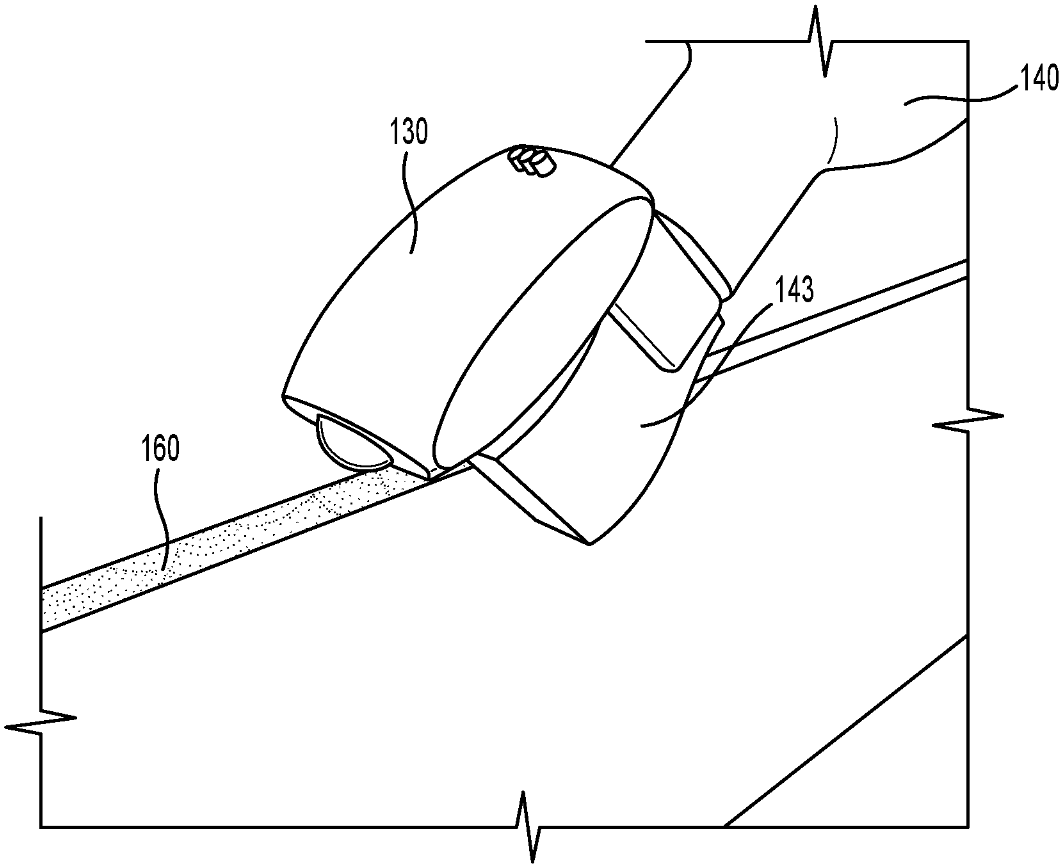
FIG. 5 is an illustration of the CQCM attached to the nozzle.

The plunger sliding module (PSM) 140, as illustrated in FIG. 1A and FIG. 1B, includes a coating material plunger (container/syringe) 141 and uses two holding straps 142 for easy replacement. A replaceable injection nozzle 143 is attached to the head of the plunger. The injection nozzle 143, as illustrated in FIG. 4, has a profile 144 that is customized to a certain part edge. The nozzle further includes a threaded neck 145. The Curing and Quality Control Module (CQCM) 130 is attached to the top of the nozzle 143 as illustrated in FIG. 5.

The coating material is extruded from the plunger 140 through a linear actuation mechanism 146 that is driven by an electrical motor. The speed of extrusion is adjusted based on the feedback from the quality control module.

Front and back distance transducers 123,124 (that can, by way of non-limiting example, be IR sensors, Ultrasound, or any other distance sensor) constantly measure the height concerning the edge. This information is communicated to the main controller 110 to adjust the height of the injection nozzle to maintain the standard gap between the nozzle and the edge for optimum coating results. Adjusting the height of the nozzle is achieved by adjusting the tilting angle of the Plunger Sliding Module (PSM) 140 employing a linear actuation mechanism 170. In addition, PSM 140 can be rotated 360 degrees utilizing an upper rotational base 126, which enables it to perform coating operations in both directions to cover the entire edge surface.

Figure 6A:
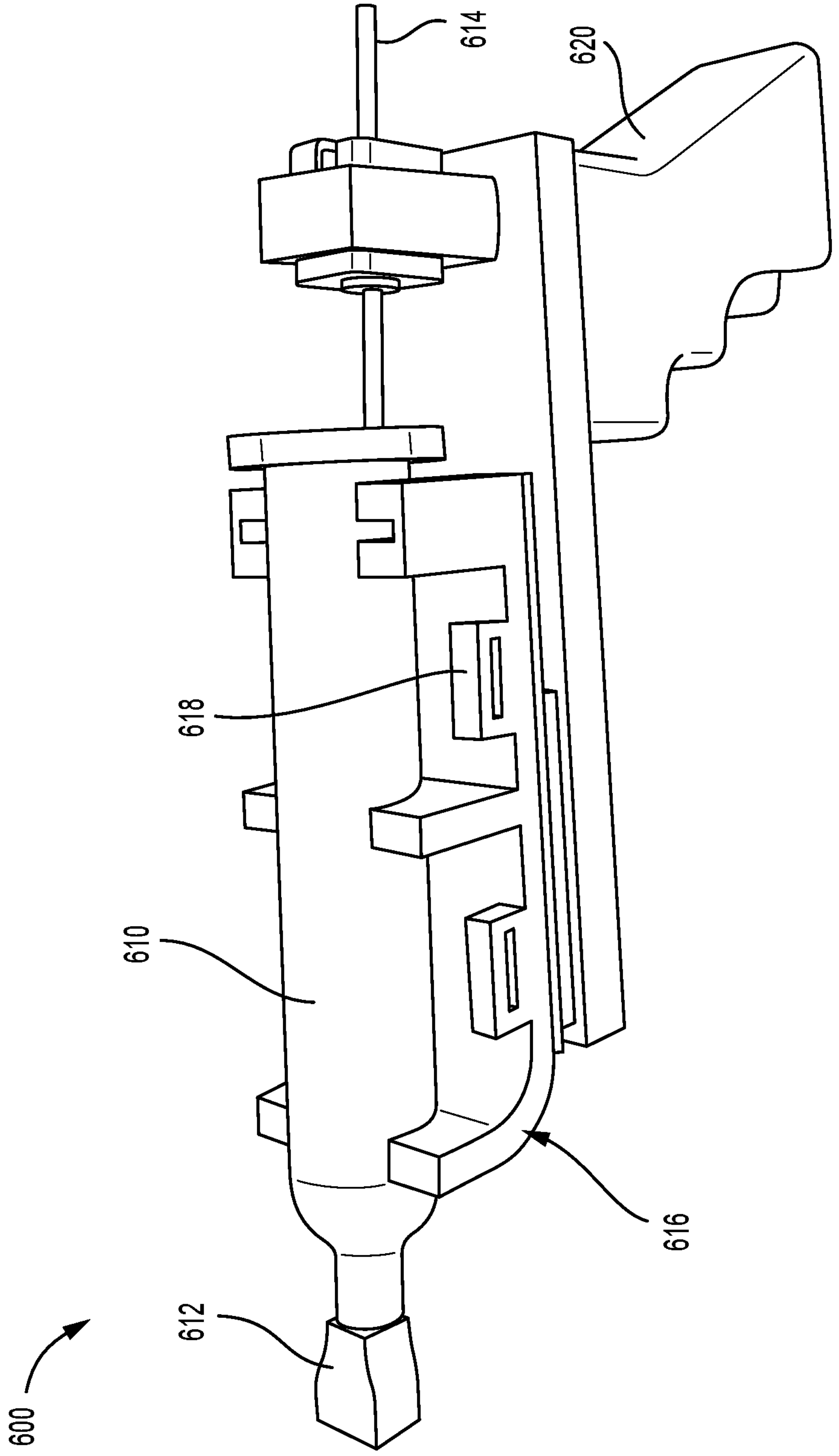
FIG. 6A, FIG. 6B and FIG. 6C are illustrations of a semi-automated handheld edge sealing device.
Figure 6B:
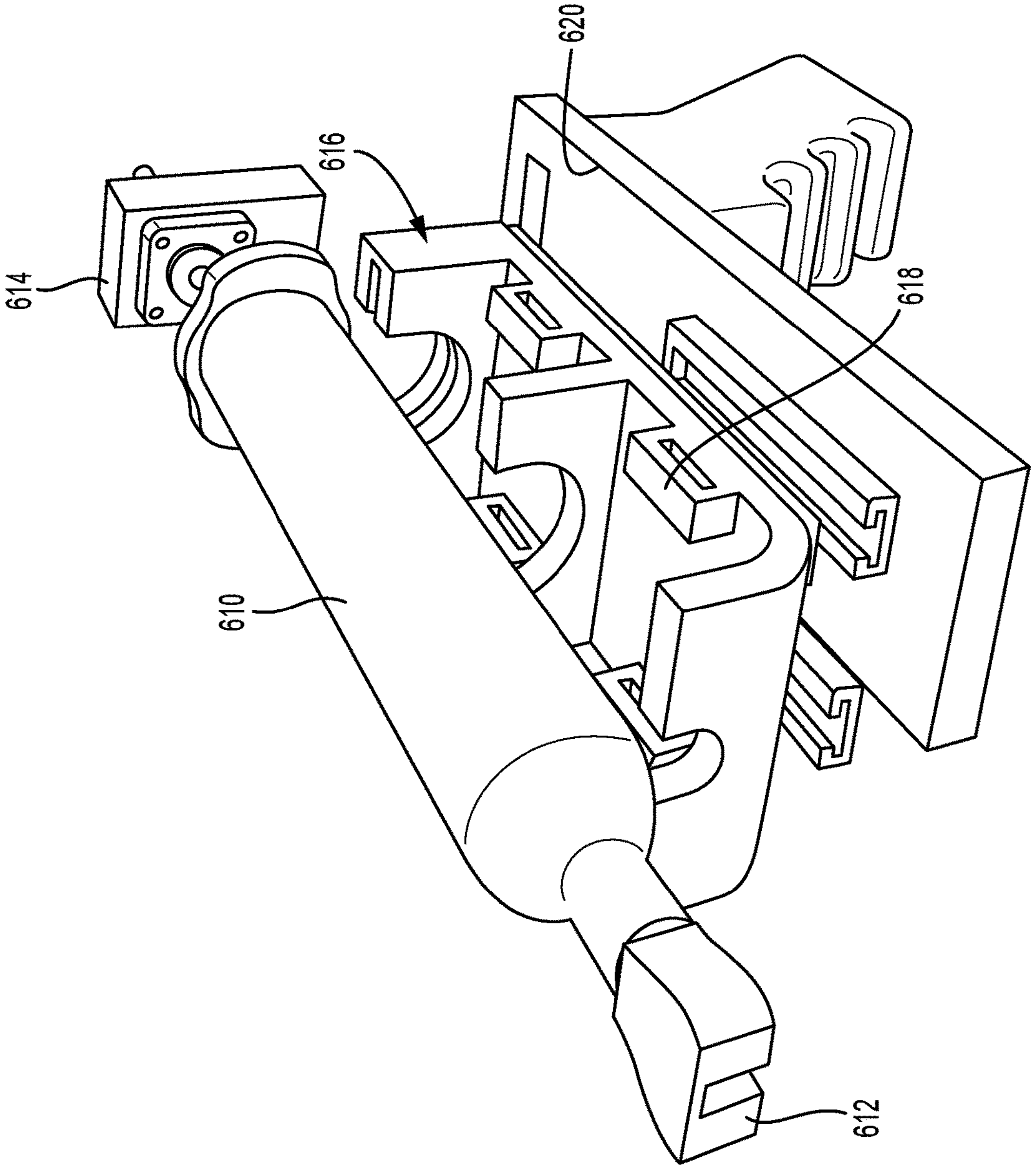
Figure 6C:
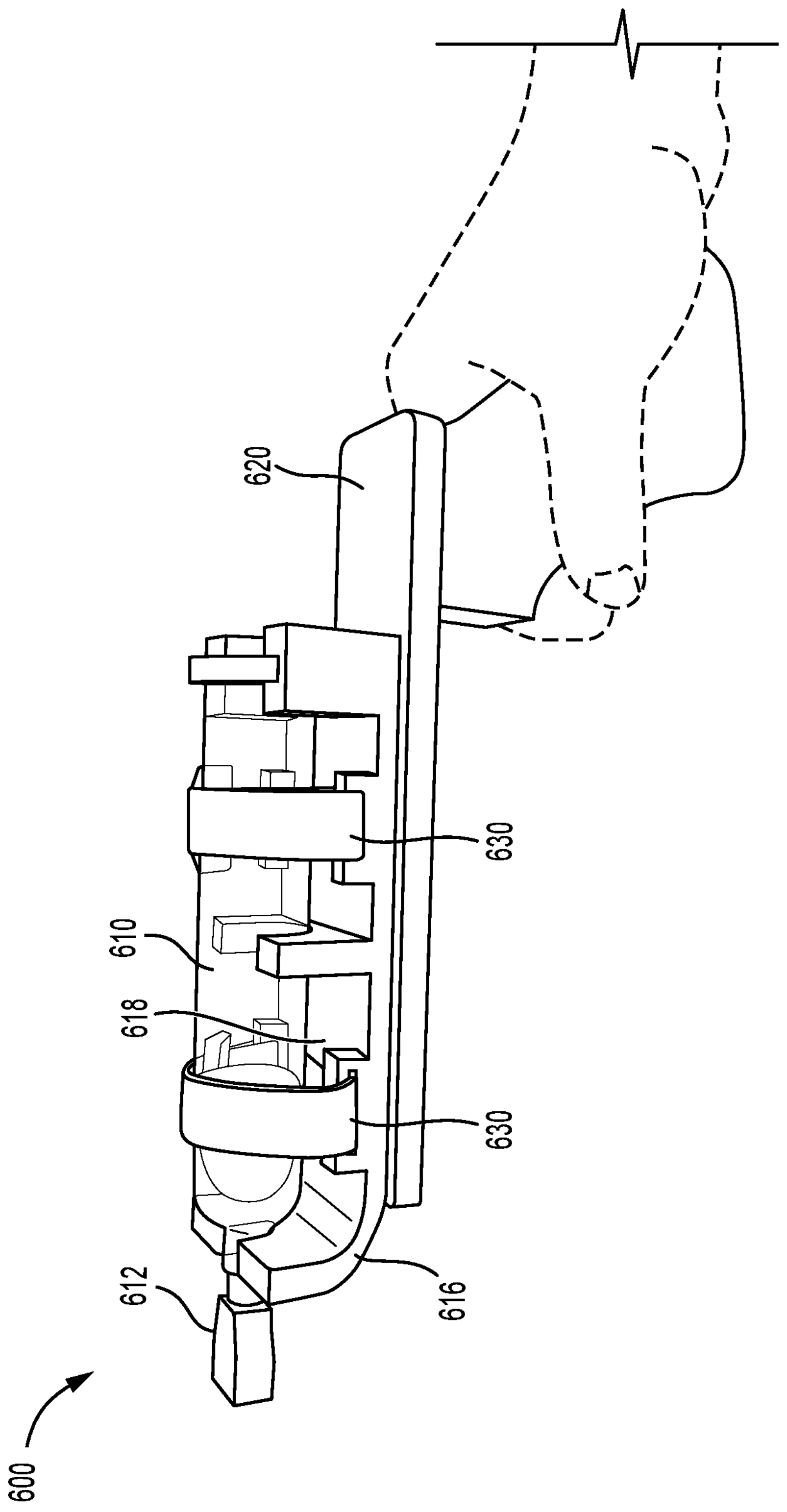

FIG. 6A, FIG. 6B and FIG. 6C are illustrations of a semi-automated handheld edge sealing device 600. It enables the users to manually perform coating on specific areas such as areas with defect coats or hard areas that cannot be reached using an automated setup. It includes a plunger 610 having an injection nozzle 612, a linear motor 614, a sliding module 616 and strip slots 618. The plunger 610 slides into a hand held base 620, as illustrated in FIG. 6B, through sliding module 616. The coating material extrusion is automated employing a linear actuation mechanism through linear motor 614. Also, the plunger 610 is attached to the sliding module 616 using strip slots 618 and straps 630 as illustrated in FIG. 6C.

The smart edge sealing device can include a fully automated mode and a semi-automated handheld mode. It can be equipped with a quality control machine learning vision system that monitors, identifies and locates (by marking and recording the position) areas or spots with coating defects, in addition, to taking corrective actions by adjusting the device motion speed and the coating injection speed to achieve the desired coating quality.

The fully automated device can be equipped with specially designed 3D printed sliding wheels using TPU material to perform both flexibility and strength. The wheels can have straight sides to avoid slipping, and provide better friction and surface stability for uneven and slippery surfaces, used to count the travel linear displacement by counting the rotation angle.

The wheels can have wavy damping rips (WDR) that perform damping characteristics due to the wavy shape, as well as allow applying a range of holding pressure on the edge while the system is traveling, and this will give a wide range of holding pressure due to the possible change in the edge thickness.

The coating material can be extruded from the plunger using a linear actuation mechanism driven by an electrical motor. The speed of extrusion can be adjusted based on feedback from the quality control module.

The system can maintain a constant height between the edge and the injection nozzle based on the edge profile measured by front and back distance transducers (that can be IR sensors, Ultrasound, or any other distance sensor). Adjusting the height of the nozzle is achieved by adjusting the tilting angle of the Plunger Sliding Module (PSM) employing a linear actuation mechanism.

The plunger can be rotated 360 degrees utilizing an upper rotational base, which enables it to perform coating operations in both directions to cover the entire edge surface.

The smart edge sealing device can provide enhanced durability. Composite edge sealing can help protect against moisture ingress, delamination, and environmental factors, thereby improving the durability and longevity of composite structures.

Improved performance can be achieved by preventing damage and maintaining the structural integrity of composite materials, edge sealing can contribute to better overall performance in terms of strength, stiffness, and resistance to degradation.

Edge sealing technology can provide protection against corrosion. It can provide a barrier against corrosive substances, particularly in industries such as automotive and marine, where composites are exposed to harsh environments.

Different edge sealing techniques and materials can be tailored to specific composite applications, allowing for customization and optimization of performance.

Figure 7:
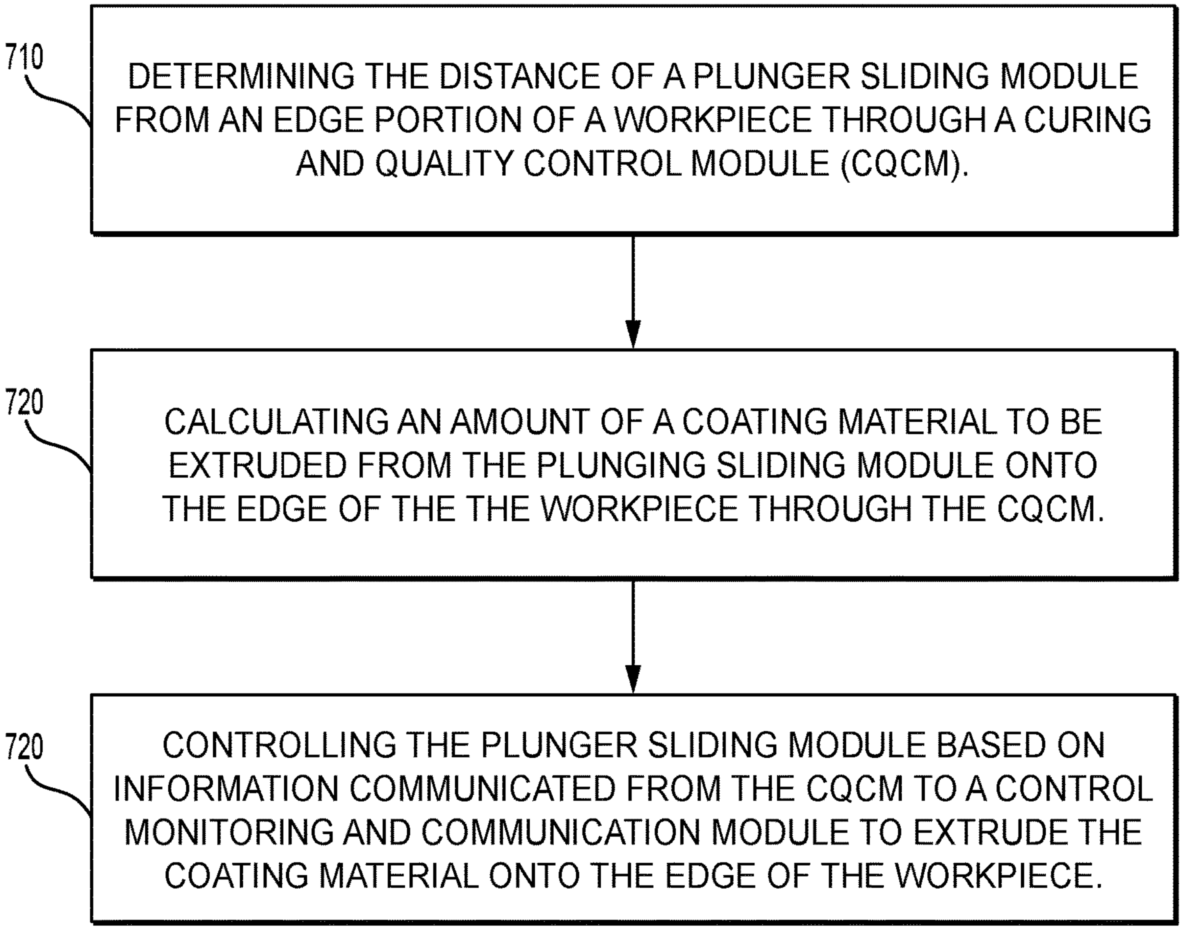
FIG. 7 is a flow diagram of a smart edge sealing method.

FIG. 7 is a flow diagram of a smart edge sealing method. The distance of a plunger sliding module from an edge portion of a workpiece is determined, in box 710, through a curing and quality control module (CQCM). An amount of a coating material to be extruded from the plunging sliding module onto the edge of the workpiece is calculated, in box 720, through the CQCM. The plunger sliding module is controlled, in box 730, based on information communicated from the CQCM to a control monitoring and communication module to extrude coating material onto the edge of the workpiece.

The method further includes adjusting the position of the plunger sliding module according to information received from the CQCM through the control monitoring and communication module.

The method further includes marking a defect area on the workpiece with a marking paint jet of the CQCM.

The method further includes curing the coating material extruded on the workpiece with a UV light.

The method further includes measuring the height of the edge of the workpiece using front and back distance transducers.

The method further includes moving the plunger sliding module with sided wheels of a motion and alignment module. The sided wheels being located on either side of the workpiece.

Edge sealing technology is a valuable tool for manufacturers of composite materials. It can help to improve the quality and performance of their products, and it can also help to reduce costs.

A smart edge sealing device is a general-purpose device that provides coating and quality control for different applications, especially industrial and aerospace industries and composite materials. It supports coating and protection processing of edges and cut boards of composites. It includes the following advantageous features:

Easy to use and can be integrated with any applications;

Economic and environmentally friendly since it uses green and recyclable materials.

Adaptable and can be easily used for different edge sizes as well as without any restrictions and limitations.

Easy to use and assemble without the need to any experience.

Reliable and easy to maintain since made from 3D-printed connected parts.

Lightweight because it is made from a green polymeric material.

Uses an open source design and material that makes it affordable, and cheap.

It is to be understood that the smart edge sealing system and method with quality control features is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A smart edge sealing system comprising:

a control, monitoring and communication module that includes a microcontroller unit (MCU) controlling system processes;

a curing and quality control module (CQCM) that includes an artificial intelligence camera and a machine learning algorithm that identifies defects or inconsistences in a coating process and communicates with the control, monitoring and communications module; and a plunger sliding module controlled by the control, monitoring and communications module, based on information received from the CQCM, to extrude a coating material on an edge of a workpiece, wherein the plunger sliding module is rotatable 360° degrees about the edge of the work piece, and wherein the plunger sliding module includes a replaceable injection nozzle that has a profile customized to a part edge.

2. The system as recited in claim 1, wherein the control, monitoring, and communication module adjusts a position of the plunger sliding module according to information received from the CQCM.

3. The system as recited in claim 1, wherein the CQCM further includes a marking paint jet that marks a defect area on the workpiece.

4. The system as recited in claim 1, further comprising a UV light to assist in a curing process.

5. The system as recited in claim 1, further comprising front and back distance transducers that measure height of an edge to be treated.

6. The system as recited in claim 1, wherein further comprising a motion and alignment module connected to the plunger sliding module and the workpiece.

7. The system as recited in claim 6, wherein the motion and alignment module includes sided wheels spaced apart to be positioned on either side of the workpiece.

8. The system as recited in claim 7, wherein the sided wheels include wavy damping ribs.

9. The system as recited in claim 7, wherein the sided wheels are 3D printed using TPU material.

10. A smart edge sealing method, comprising:

determining a distance of a plunger sliding module from an edge portion of a workpiece through a curing and quality control module (CQCM);

calculating an amount of a coating material to be extruded from the plunger sliding module onto the edge portion of the workpiece through the CQCM; and controlling the plunger sliding module based on information communicated from the CQCM to a control, monitoring and communication module, wherein the plunger sliding module is rotatable 360° degrees about the edge portion of the work piece, and wherein the plunger sliding module includes a replaceable injection nozzle that has a profile customized to a part edge.

11. The method as recited in claim 10, further comprising adjusting a position of the plunger sliding module according to information received from the CQCM through the control, monitoring and communication module.

12. The method as recited in claim 10, further comprising marking a defect area on the workpiece with a marking paint jet of the CQCM.

13. The method as recited in claim 10, further comprising curing the coating material extruded on the workpiece with a UV light.

14. The method as recited in claim 10, further comprising measuring a height of the edge portion of the workpiece using front and back transducers.

15. The method as recited in claim 10, further comprising moving the plunger sliding module with sided wheels of a motion and alignment module, the sided wheels located on either side of the workpiece.

* * * * *